UNITED STATES PATENT OFFICE.

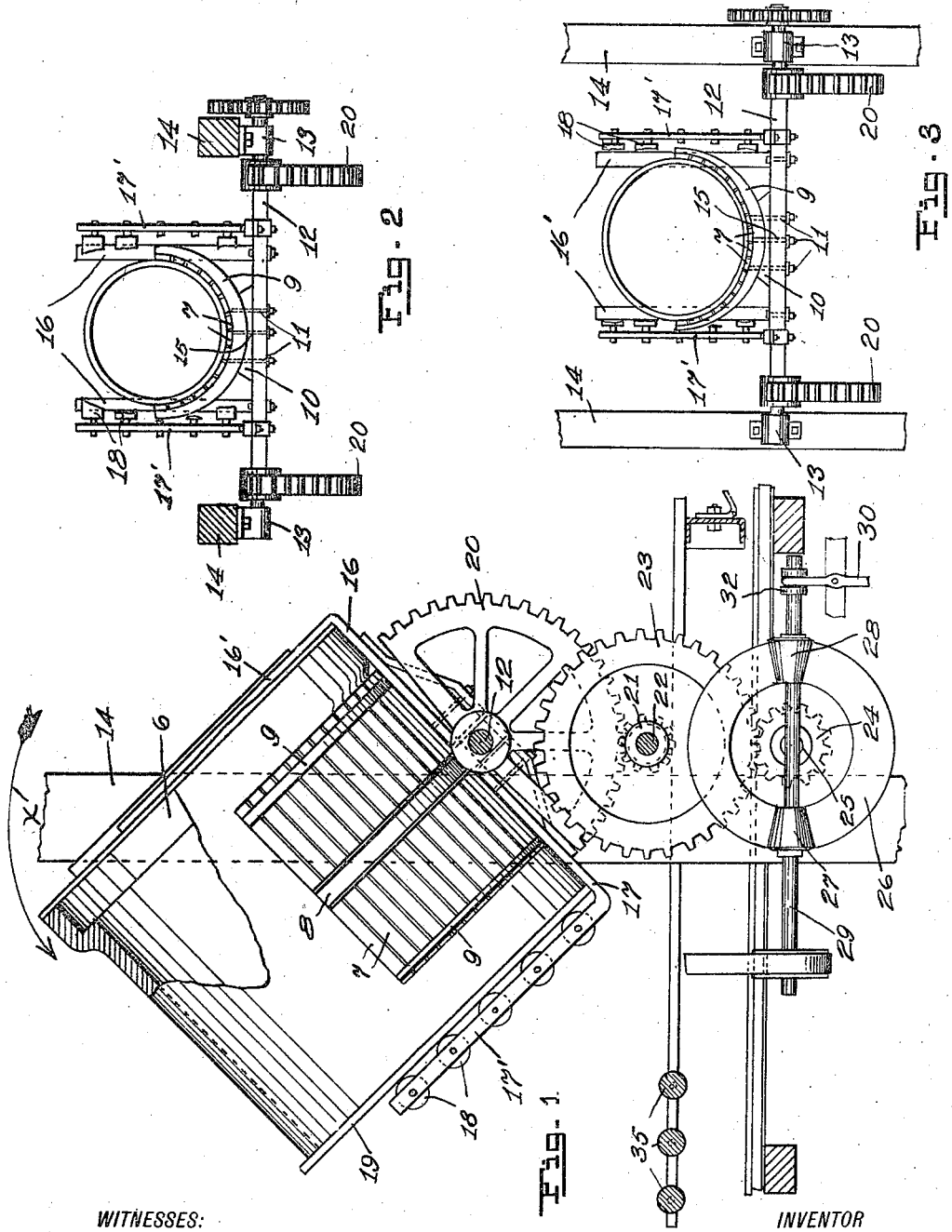

JOHN F. KEENAN, OF SEATTLE, WASHINGTON.

PIPE-TURNER.

1,191,126.

Specification of Letters Patent.   Patented July 11, 1916.

Application filed June 22, 1915. Serial No. 35,545.

*To all whom it may concern:*

Be it known that I, JOHN F. KEENAN, a citizen of the United States, residing at Seattle, in the county of King and State of Washington, have invented certain new and useful Improvements in Pipe-Turners, of which the following is a specification.

This invention relates to improvements in devices for inverting sewer pipe in its plastic state, and has for its object the provision of a pipe cradle which will yieldingly support the pipe while being turned and avoid marring the exterior of pipe of relatively large diameters and also prevent cracking or collapse of the pipe while the weight of the pipe is carried upon the side thereof.

The invention consists in the novel construction and arrangement of a pipe turning-cradle, as will be fully described in the following specification, illustrated in the accompanying drawings and finally set forth in the appended claims.

In the accompanying drawings, Figure 1 is a view partly in side elevation and partly in section of pipe-turning mechanism embodying my invention. Fig. 2 is a top plan view illustrating said apparatus and the pipe before being turned; and Fig. 3 is a side elevation of the same during an intermediate period of the turning movements of the pipe.

After being formed in an upright cylindrical mold of ordinary or suitable construction a "socket board" 6, is introduced into the depending pipe-socket before the pipe is severed from the mold. The pipe is then conveyed away from the press and is turned in order that it may rest upon its opposite or spigot end. Improved apparatus for handling the pipe from the press and conveying it to the turning apparatus is fully described and illustrated in my co-pending application Serial No. 764,543, to which reference may be made.

The referred to turning apparatus comprises a cradle-frame constituted of a plurality of slats, 7, secured in spaced relation to the inner peripheral surface of semi-circular ribs 8 and 9, of which the rib 8 is disposed in proximity to the mid-lengths of the slats and the others 9, are in proximity to the ends of the same. Said ribs are sufficiently flexible to yield to the weight of the pipe when the pipe is being inverted and to this end the ribs may be tapered toward each end from their middle portions. The central rib 8, is secured to the saddle block 10, which in turn is detachably secured by U-shaped bolts 11 to a horizontal shaft 12, which serve as trunnions for the cradle and is rotatable in journal boxes 13, secured to post 14.

15 represents a centering bolt extending from the saddle block 10 and engaging in a hole provided in the shaft 12, for maintaining the cradle in proper position to receive a pipe from the conveying apparatus. Adjustably secured to the shaft 12, in opposite sides of the axis of the cradle are upright bars 16 and 17, provided at their lower and upper ends, respectively, with forwardly extending arms $16^1$ and $17^1$.

The arms $16^1$ are arranged to engage the under side of said socket board 6 to raise the pipe preparatory to turning the same. The other arms $17^1$ support the axles of rollers 18 upon which a pallet 19 is positioned before the pipe is inverted. The trunnion shaft 12, has mounted thereon adjacent to its ends, semi-circular or sector gear wheels 20, having spur teeth which engage with spur pinions 21, provided upon a horizontal shaft 22 which is disposed below the shaft 12. A spur gear 23, is mounted on the shaft 22, and is in mesh with a pinion 24, which is carried by a third horizontal shaft 25. Secured to the last named shaft is a friction wheel 26, which is arranged to be engaged by either of the wheels 27 or 28, secured upon a power driven shaft 29 whereby the shaft 28 may be rotated in either direction to correspondingly effect a partial rotation of the cradle upon its trunnion shaft 42.

30 represents a forked controlling lever engaging in a grooved collar 32, provided on shaft 29 whereby the latter may be axially shifted to present either of the wheels 27 or 28 into frictional engagement with the wheel 26 when the cradle is to be turned in one direction or the other, as will be hereinafter more fully explained.

In operation, the pipe is conveyed to the cradle-frame by any suitable mechanism and deposited upon the arms $16^1$, which engage the lower surface of the socket board 6 and with the semi-circular ribs 8 and 9, while the arms $17^1$ are presented above the pipe and pallet 19. The operator then manipulates the lever, 30 to impart longitudinal motion to the shaft 29 to cause friction wheel 28 to engage friction wheel 26 thereby rotating the latter, whereupon the associated gearing is actuated to transmit rotary motion to the trunnion shaft 12 to revolve the cradle and the contained pipe in the direction indicated by arrow "X" in Fig. 1.

As the sector gear 20 is of semi-circular configuration when a half revolution is made through the coaction of the pinion 21 therewith, the pinion becomes disengaged and inoperative as the cradle reaches a vertical position upon the opposite side of the trunnion shaft from that in which it started. In such condition of the cradle the pipe is in its inverted position resting on the pallet which is supported by the rollers 18, from which the pipe, while still on the pallet, may be readily drawn from the cradle upon floor rollers 36, and with the hub of the pipe uppermost. When the pipe has been removed from the cradle, shaft 29 is shifted by the operator to cause the wheel 27 to become operative to effect the reverse movement of the cradle so as to be in position to receive another pipe.

The turning cradle, through its construction of slats 7, secured to yielding ribs 8 and 9, affords a frame which is normally semi-circular in horizontal section adapted to embrace the exterior of a pipe of suitable diameter and tends to support the same while in its vertical relation in such circular shape. When the cradle, however, is rotated upwardly and the weight of the pipe is transferred from longitudinal to transverse directions, the cradle ribs are adapted to yield under such weight and spread out to a wider extent across their outer extremities. The pipe structure is plastic and yieldable and tends to assume an ovoid form in cross section when its weight is carried on its side which the resilient ribs are arranged to permit, see Fig. 3.

Upon the further progress of the pipe in its turning movements, as the longitudinal axis of the pipe attains a progressively more vertical position, the resiliency of the ribs increasingly asserts itself to again assume a semi-circular configuration, and with the decrease in pressure thereon, return the pipe back to its original semi-circular position as the pipe is deposited upon the floor rollers 35, as heretofore explained.

The advantages residing in my improved turning apparatus are particularly the prevention of loss in pipe of large diameters and of correspondingly heavy side walls. The cracking of the side walls due to an unyielding pipe cradle has been heretofore a serious factor and is almost entirely eliminated through the means provided, also through the use of my devices the slats 7 of the cradle do not leave a mark on the exterior surface of the pipe; such marks have heretofore been a serious detraction from the appearance of the finished pipe and are found upon the pipe upon opposite sides thereof adjacent to the exterior ends of the pipe cradle where the extra pressure due to the lateral expansion of the pipe causes the slats to dig into the pipe material. By my yielding rib device this difficulty is entirely avoided and the pipe exterior is perfectly smooth after being turned in my turning apparatus.

Having described my invention, what I claim is—

1. In devices of the class described, a turning cradle for pipe consisting in a plurality of normally semi-circular ribs of resilient material having unobstructed yielding flexibility at their outer extremities.

2. In devices of the class described, a turning cradle for pipe, consisting in a plurality of normally semi-circular ribs adapted to support a pipe and resiliently yield in lateral directions under the weight of said pipe.

3. In a turning cradle for pipe, a plurality of ribs of resilient material, said ribs being free at their outer extremities to yield in lateral directions under the weight of said pipe.

Signed at Seattle, Washington, this 16th day of June 1915.

JOHN F. KEENAN.

Witnesses:
HORACE BARNES,
PIERRE BARNES.

Copies of this patent may be obtained for five cents each, by addressing the "Commissioner of Patents, Washington, D. C."